United States Patent
Little et al.

(10) Patent No.: US 9,984,004 B1
(45) Date of Patent: May 29, 2018

(54) DYNAMIC CACHE BALANCING

(71) Applicant: Nutanix, Inc., San Jose, CA (US)

(72) Inventors: Gary Jeffrey Little, Chapel Hill, NC (US); Huapeng Yuan, Kenmore, WA (US); Karan Gupta, San Jose, CA (US); Peter Scott Wyckoff, Durham, NC (US); Rickard Edward Faith, Hillsborough, NC (US)

(73) Assignee: Nutanix, Inc., San Jose, CA (US)

( * ) Notice: Subject to any disclaimer, the term of this patent is extended or adjusted under 35 U.S.C. 154(b) by 129 days.

(21) Appl. No.: 15/214,264

(22) Filed: Jul. 19, 2016

(51) Int. Cl.
| | |
|---|---|
| *G06F 12/00* | (2006.01) |
| *G06F 13/00* | (2006.01) |
| *G06F 13/28* | (2006.01) |
| *G06F 12/128* | (2016.01) |
| *G06F 12/0808* | (2016.01) |

(52) U.S. Cl.
CPC ........ *G06F 12/128* (2013.01); *G06F 12/0808* (2013.01); *G06F 2212/621* (2013.01); *G06F 2212/69* (2013.01)

(58) Field of Classification Search
CPC .............. G06F 12/128; G06F 12/0808; G06F 2212/621; G06F 2212/69
USPC ....................................................... 711/135
See application file for complete search history.

(56) References Cited

U.S. PATENT DOCUMENTS

| | | | | |
|---|---|---|---|---|
| 4,691,277 A | * | 9/1987 | Kronstadt | G06F 9/3806 711/213 |
| 5,732,267 A | * | 3/1998 | Smith | G06F 12/0862 707/E17.01 |
| 6,209,058 B1 | * | 3/2001 | Shats | G06F 12/0866 360/71 |
| 6,486,803 B1 | * | 11/2002 | Luby | H04L 1/0083 341/50 |
| 6,698,015 B1 | * | 2/2004 | Moberg | G06F 9/44521 717/141 |
| 6,708,330 B1 | * | 3/2004 | Moberg | G06F 9/44521 711/118 |

(Continued)

OTHER PUBLICATIONS

IEEE Computer Society (http://www.ieee.org), Yanfei Guo et al.,"V-Cache: Towards Flexible Resource Provisioning for Multi-tier Applications in IaaS Clouds" (/csdl/-abs.html) 2013 (Abstract) to ISBN: pp. 88-99 (2 pages) url: https://www.computer.org/csdl/proceedings/ipdps/2013/4971/00/497lao.

*Primary Examiner* — Sheng-Jen Tsai
(74) *Attorney, Agent, or Firm* — Vista IP Law Group, LLP

(57) ABSTRACT

Embodiments serve to balance overall performance of a finite-sized caching system having a first cache of a first cache size and a second cache of a second cache size. A tail portion and a head portion of each of the caches are defined wherein incoming data elements are initially stored in a respective head portion and wherein evicted data elements are evicted from a respective tail portion. Performance metrics are defined wherein a performance metric includes a predicted miss cost that would be incurred when replacing an evicted data elements. A quantitative function is defined to include cache performance metrics and a cache reallocation amount. The cache performance metrics are evaluated periodically to determine a then-current cache reallocation amount. The caches can be balanced by increasing the first cache size by the cache reallocation amount and decreasing the second cache size by the cache reallocation amount.

20 Claims, 10 Drawing Sheets

(56) References Cited

U.S. PATENT DOCUMENTS

| | | | | |
|---|---|---|---|---|
| 7,800,632 B2* | 9/2010 | Qi | ............................ | G06T 11/40 345/441 |
| 9,317,379 B2* | 4/2016 | Gschwind | ........... | G06F 11/1474 |
| 9,678,874 B2* | 6/2017 | Nellans | ................ | G06F 12/0833 |
| 2003/0028728 A1* | 2/2003 | Ito | ........................ | G06F 12/0815 711/118 |
| 2004/0186862 A1* | 9/2004 | Garthwaite | ......... | G06F 12/0276 |
| 2004/0268051 A1* | 12/2004 | Berg | ........................ | G06F 9/342 711/137 |
| 2006/0181953 A1* | 8/2006 | Rotenberg | ........... | G06F 13/4239 365/230.06 |
| 2006/0184737 A1* | 8/2006 | Yamada | .............. | G06F 12/0846 711/118 |
| 2007/0050603 A1* | 3/2007 | Vorbach | .............. | G06F 9/30181 712/221 |
| 2007/0083730 A1* | 4/2007 | Vorbach | ................ | G06F 9/3897 712/10 |
| 2007/0174550 A1* | 7/2007 | Maeda | ................... | G06F 3/0608 711/118 |
| 2007/0226422 A1* | 9/2007 | Mino | ................... | G06F 12/0862 711/137 |
| 2010/0095057 A1* | 4/2010 | Li | ........................ | G06F 12/0893 711/104 |
| 2010/0115240 A1* | 5/2010 | Falik | ................... | G06F 9/30032 712/210 |
| 2010/0153654 A1* | 6/2010 | Vorbach | .............. | G06F 12/0862 711/137 |
| 2011/0219208 A1* | 9/2011 | Asaad | ..................... | G06F 15/76 712/12 |
| 2011/0238948 A1* | 9/2011 | Vorbach | .............. | G06F 15/7867 712/15 |
| 2012/0198174 A1* | 8/2012 | Nellans | ............... | G06F 12/0804 711/133 |
| 2013/0094318 A1* | 4/2013 | Kim | .................... | G06F 11/1064 365/227 |
| 2014/0115569 A1* | 4/2014 | Jung | ..................... | G06F 8/4432 717/160 |
| 2015/0106596 A1* | 4/2015 | Vorbach | ................ | G06F 9/3001 712/221 |
| 2015/0128007 A1* | 5/2015 | Kim | ........................ | G11C 29/52 714/763 |
| 2016/0196193 A1* | 7/2016 | Gschwind | ........... | G06F 11/1474 714/16 |
| 2017/0220719 A1* | 8/2017 | Elrabaa | .............. | G06F 17/5022 703/20 |

* cited by examiner

DYNAMIC CACHE BALANCING

FIELD

This disclosure relates to distributed data storage, and more particularly to techniques for dynamic sizing of multiple cache partitions.

BACKGROUND

The use of virtual machines (VMs) to improve the utilization of computing resources continues to increase. Such VMs can be characterized as software-based computing "machines" implemented in a virtualization environment comprising various hardware resources (e.g., CPU, memory, etc.). The VMs can operate based at least in part on the computer architecture and/or functions (e.g., operating system) of a real or hypothetical computer. Multiple VMs can operate on one physical machine (e.g., on a physical computer), with each VM sharing the resources of that physical machine across multiple environments. Various VMs can run multiple operating systems and/or multiple applications on the physical machine. Flexibility for such sharing can be facilitated at least in part by a hypervisor, which hypervisor allocates hardware resources dynamically and transparently to the running VM.

The high storage I/O (input/output or IO) demands of VMs has precipitated an increase in distributed storage systems that are implemented in virtualization environments. Specifically, such distributed storage systems can aggregate various physical storage facilities to create a logical storage pool where certain data may be efficiently distributed according to various metrics and/or objectives. Metadata describing the storage pool and/or its virtualized representations may be also distributed any number of times among various nodes in the distributed storage system. Many of these distributed storage systems implement various caching techniques to reduce the latency in accessing the foregoing data and/or metadata by the VMs and/or by certain components (e.g., storage I/O controllers) of the distributed storage systems. Specifically, multi-tier caching systems can improve the overall latency of operations by storing frequently used data elements in storage areas that correspond to observed access patterns. As an example, a dynamic random access memory (DRAM) can be used to cache items that are stored on hard disk drives (HDDs) to facilitate low latency access. In some cases, a given cache might be allocated across multiple tiers of storage facilities such as local (e.g., to a storage I/O controller) DRAM, local (e.g., to a node) solid-state drives (SSDs), cluster SSDs, local hard disk drives (HDDs), networked HDDs, and/or other storage tiers. In other cases, a cache in a distributed storage system might be partitioned into multiple cache partitions for various purposes.

Unfortunately, legacy techniques for sizing multiple cache partitions in a distributed storage system can be limited at least in their ability to address the performance by and between each of the multiple cache partitions. Specifically, the performance of a cache can be determined at least in part by the data access latency improvement resulting from the data being stored in the cache as compared to the access latency if the data were stored in a non-cache storage facility (e.g., networked HDD). Some legacy approaches for sizing a cache might merely facilitate allocating a fixed amount of memory for the cache and applying certain cache management techniques (e.g., least recently used or LRU, least frequently used or LFU, adaptive replacement cache or ARC, etc.) to determine whether or not to store and/or to retain a particular data element in the cache.

For example, the foregoing legacy techniques might allocate 1 GB of memory to a given cache and, when the cache is full, evict data elements from the cache based at least in part on a data element access time, access frequency, a combination of access time and access frequency, and/or other criteria. However, when a cache is partitioned for two or more data element types, or partitioned over two or more memory types, applying such legacy cache management techniques to the cache partitions might not achieve optimal overall performance by and between the cache partitions. This is because if a cache configuration/management policy is applied independently to the two or more partitions, then the relative importance of data items with respect to each individual cache partition to the overall system is not considered, which results in overall cache performance that may be less than optimal.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamic sizing of multiple cache partitions, which techniques advance the relevant technologies to address technological issues with legacy approaches. More specifically, the present disclosure provides a detailed description of techniques used in systems, methods, and in computer program products for dynamic sizing of multiple cache partitions. Certain embodiments are directed to technological solutions for implementing a heuristic cache partition balancing technique to dynamically size multiple cache partitions based at least in part on cost calculations.

The disclosed embodiments modify and improve over legacy approaches. In particular, the herein-disclosed techniques provide technical solutions that address the technical problems attendant to balancing the sizes of multiple cache partitions to improve overall caching performance. Such technical solutions can serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
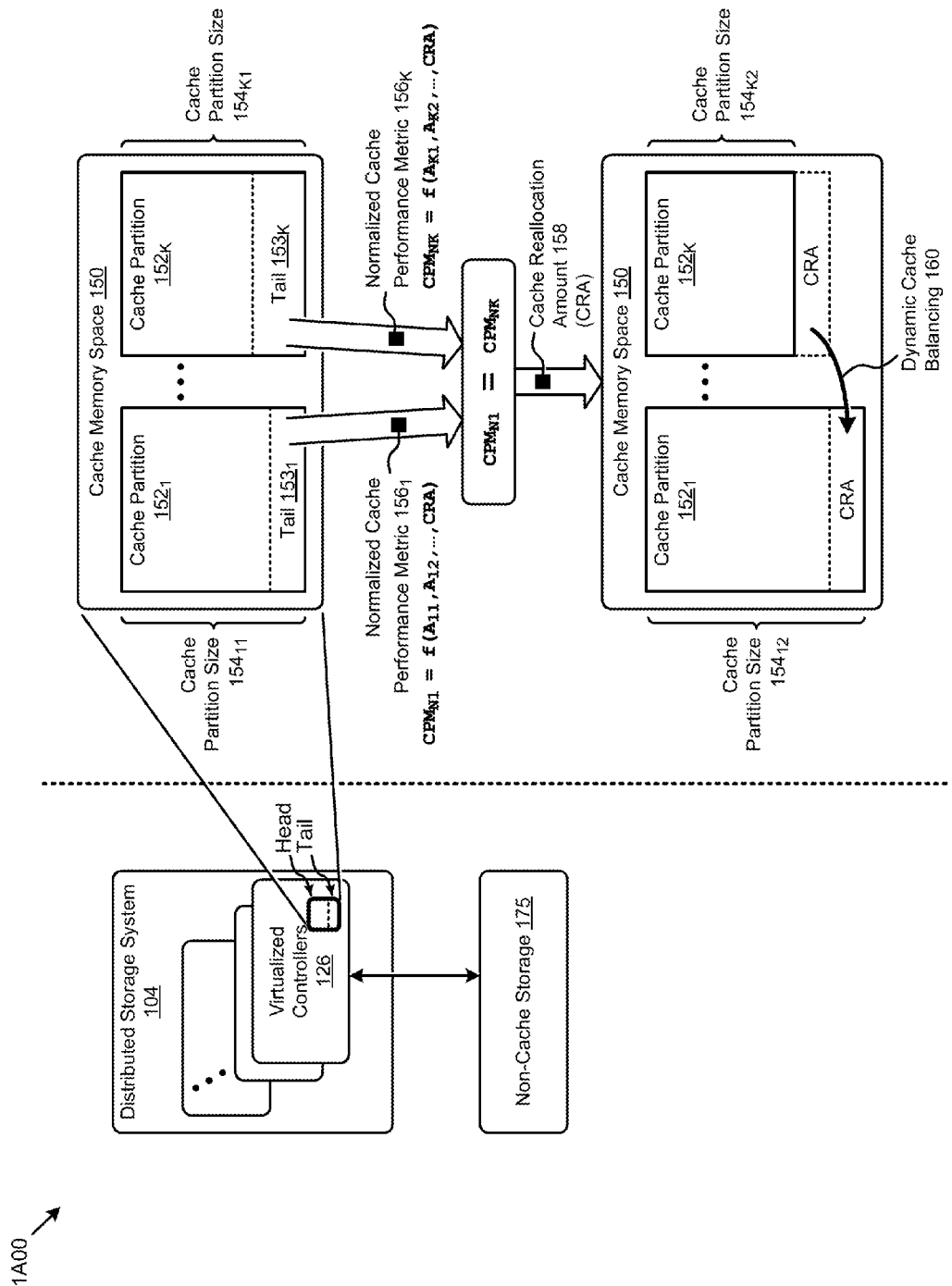
FIG. 1A presents a dynamic cache sizing technique used in systems that implement dynamic sizing of multiple cache partitions, according to an embodiment.

Some embodiments of the present disclosure address the problem of balancing the sizes of multiple cache partitions to improve overall caching performance and some embodiments are directed to approaches for implementing a heuristic cache partition balancing technique to dynamically size multiple cache partitions based at least in part on cost calculations. The accompanying figures and discussions herein present example environments, systems, methods, and computer program products for dynamic sizing of multiple cache partitions.

In situations involving multiple caches, one data element type in a first cache might have a high "miss cost" (e.g., the latency to bring a data element into the cache) as compared to another data element type in a second cache. In such cases, allocating an equal amount of the total cache memory to the aforementioned two caches might result in the performance of the high miss cost cache partition being less than its maximum performance if the sizes of the caches were adjusted using the herein-disclosed techniques. Furthermore, cache performance associated with caches having a priori apportioned (or fixed) might need to change frequently based on real time conditions. Strictly as one example, relative sizes of multiple caches can be adjusted with respect to ongoing changes in measurable characteristics (e.g., I/O activity, storage utilization, etc.).

Overview

Disclosed herein are techniques for implementing a normalized balancing technique to dynamically size multiple caches in a distributed storage system, while still observing constraints pertaining to a finite amount of memory being allocated to the multiple caches. In various embodiments, attributes pertaining to the structure and/or content of the caches and/or their partitions or sub-partitions can be collected to derive normalized cache performance metrics that can be analyzed to determine cache size adjustments. For example, in some embodiments, certain cache partition attributes (e.g., then-current cache size, etc.) and/or data element attributes (e.g., miss cost, timestamp, etc.) might be collected and combined with a variable representing a cache reallocation amount (CRA) to determine a normalized cache performance metric for each of the cache partitions, and then further, to balance the sizes of the cache partitions to achieve improved overall performance. Such balancing can be implemented by adjusting the cache size of one or more of the cache partitions according to a cache reallocation amount derived from comparing the normalized cache performance metrics for the cache partitions. In certain embodiments, the normalized cache performance metric can be derived from a cache partition "tail" to represent the incremental value of adding more data elements to the cache partition. In some embodiments, the caches size adjustments can be dynamically determined and/or applied in response to various triggers such as a change in the cache partition attributes or such as a change in the constitution and/or of access patterns pertaining to the data elements stored in the cache.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A presents a dynamic cache sizing technique 1A00 used in systems that implement dynamic sizing of multiple cache partitions. As an option, one or more variations of dynamic cache sizing technique 1A00 or any aspect thereof may be implemented in the context of the architecture and functionality of the embodiments described herein. The dynamic cache sizing technique 1A00 or any aspect thereof may be implemented in any environment.

The dynamic cache sizing technique 1A00 shown in FIG. 1A depicts a distributed storage system 104 comprising multiple storage controllers implemented as a set of virtualized controllers 126. The virtualized controllers 126 can access a set of non-cache storage 175 comprising, for example, remote and/or networked storage facilities. As shown, virtualized controllers 126 can further manage a cache memory space 150. For example, the cache memory space 150 might comprise a portion of the dynamic random access memory (DRAM) and/or solid state drives (SSDs) local to virtualized controllers 126 to facilitate low latency access to certain data elements.

In some cases, the cache memory space 150 can be partitioned into multiple cache partitions (e.g., cache partition $152_1$, . . . , cache partition $152_K$) to hold a respective type of data element. For example, one cache partition might be used to manage extent data while another cache partition might be used to manage metadata. In some cases, the cache memory space 150 might be allocated to such cache partitions in equal portions, such as indicated by cache partition size $154_{11}$ and cache partition size $154_{K1}$. Further, the cache partitions might implement certain cache management techniques (e.g., LRU, LFU, ARC, etc.) to determine whether or not to store and/or retain a particular data element in the cache.

However, when a cache is partitioned for differing data element types, applying such cache sizing and/or management techniques to the cache partitions might not maximize the combined performance of the cache partitions. For example, one data element type in cache partition $152_1$ might have a high "miss cost" (e.g., the latency incurred to bring a data element into the cache) as compared to another data element type in cache partition $152_K$. In such cases, allocating an equal amount of the total cache memory to the cache partitions might result in the performance of the high miss cost cache partition being less than its maximum performance. Further, the cache partition performance associated with cache partitions with fixed sizes can vary with respect to varying characteristics (e.g., I/O activity, storage utilization, etc.) and/or real time conditions of distributed storage system 104.

The herein disclosed techniques can address the foregoing issues attendant to balancing the sizes of multiple cache partitions to improve overall caching performance. Specifically, attributes (e.g., $A_{11}, A_{12}, \ldots, A_{K1}, A_{K2}, \ldots$) pertaining to the structure and/or content of the cache partitions can be collected and combined with a variable representing a cache reallocation amount (CRA) to derive normalized cache performance metrics (e.g., normalized cache performance metric $156_1$, . . . , normalized cache performance metric $156_K$) that can be analyzed to determine cache size adjustments.

More specifically, as shown, the normalized cache performance metric for each cache partition can be derived from a cache partition "tail" (e.g., tail $153_1$, . . . , tail $153_K$) to represent the incremental value of adding more data elements to the cache partition. The normalized cache performance metrics can be compared using a formulaic expression to determine a cache reallocation amount 158 (e.g., where the cache reallocation amount is a size or quantity of memory in bytes or Kbytes, or pages, etc.). The resulting CRA can be used to balance the sizes of the cache partitions to achieve improved overall performance. For example, as shown, the CRA might be removed from the cache partition $152_K$ and added to the cache partition $152_1$, resulting in updated instances of a cache partition size $154_{K2}$ and a cache partition size $154_{12}$, respectively. In some embodiments, the caches size adjustments can perform dynamic cache balancing 160, where caches size adjustments are determined and/or applied in response to various triggers such as a change in the cache partition attributes or such as a change in the constitution of data elements stored in the cache.

Figure 1B:
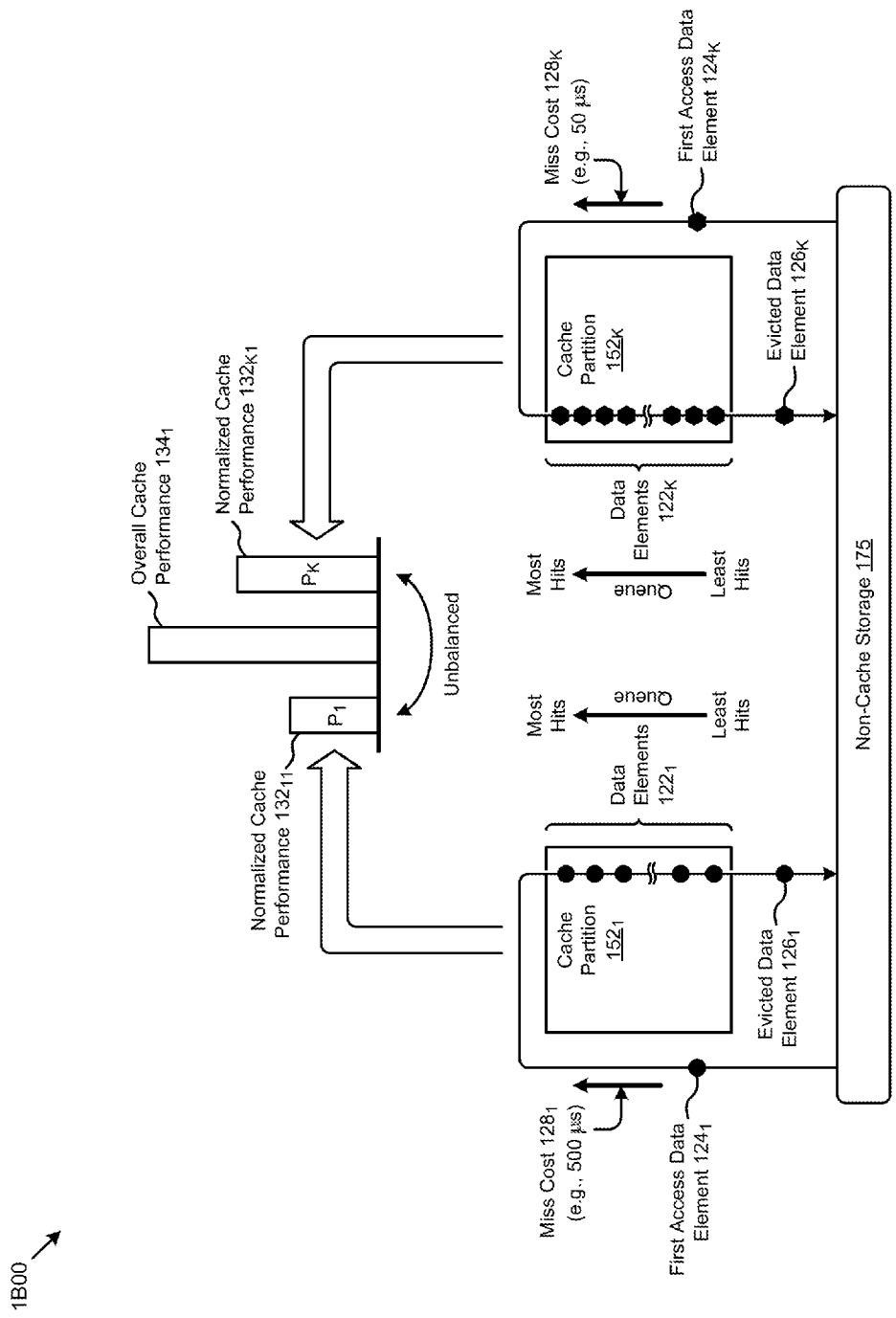
FIG. 1B presents a normalized cache performance comparison technique.

Further details related to comparing the performance of various cache partitions is shown and described as pertaining to FIG. 1B.

FIG. 1B presents a normalized cache performance comparison technique 1B00. As an option, one or more variations of normalized cache performance comparison technique 1B00 or any aspect thereof may be implemented in the context of the architecture and functionality of the embodiments described herein. The normalized cache performance comparison technique 1B00 or any aspect thereof may be implemented in any environment.

FIG. 1B depicts the representative cache partitions (e.g., cache partition $152_1$, . . . , cache partition $152_K$) earlier shown and described as pertaining to FIG. 1A. Further shown are a set of data elements $122_1$ comprising cache partition $152_1$ and a set of data elements $122_K$ comprising cache partition $152_K$. One or more of the earlier described cache management techniques (e.g., LRU, LFU, ARC, etc.) might logically arrange the data elements in the cache partition according to a data element queue. For example, the data elements at the top of the queue might correspond to those data elements accessed or "hit" most often, and the data elements at the bottom of the queue might correspond to data elements accessed or "hit" least often. New data elements that are first accessed (e.g., first access data element $124_1$, . . . , first access data element $124_K$) can enter into the top of the queue from non-cache storage 175.

Certain data elements can also be evicted from the cache partition. For example, evicted data element $126_1$ and evicted data element $126_K$ might be evicted from cache partition $152_1$ and cache partition $152_K$, respectively, to make room for first access data element $124_1$ and first access data element $124_K$, respectively. The evicted data elements can be selected, for example, based on queue position (e.g., least hit elements are evicted).

In one approach, a measure of the performance of a cache system or individual cache partition can be derived from the incremental "value" of caching one more data element. Since the purpose of the cache partition is at least in part to reduce the data element access latency, such value can be based at least in part from the "cost" (e.g., access latency) of retrieving a data element not in cache. Such a cost can be referred to as a "miss cost". The miss cost can vary for respective data element types. For example, a data element from cache partition $152_1$ might have a miss cost $128_1$ of 500 μS and a data element from cache partition $152_K$ might have a miss cost $128_K$ of 50 μS.

Performance metrics normalized by such attributes as miss cost can be used to compare the performance of various cache partitions. For example, as shown in FIG. 1B, cache partition $152_1$ might have a normalized cache performance $132_{11}$ and cache partition $152_K$ might have a normalized cache performance $132_{K1}$. As shown, the performance of the two cache partitions is unbalanced. Such imbalance can be due to earlier described miss cost differences, relative cache partition sizes, total cache queries, and/or other factors. In some cases, the unbalanced cache partitions can result in an overall cache performance $134_1$ (e.g., for the entire allocated cache memory space) that is not maximized. The herein disclosed techniques can address the foregoing issues attendant to balancing the sizes of the cache partitions to improve overall caching performance as shown and described as pertaining to FIG. 1C.

Figure 1C:
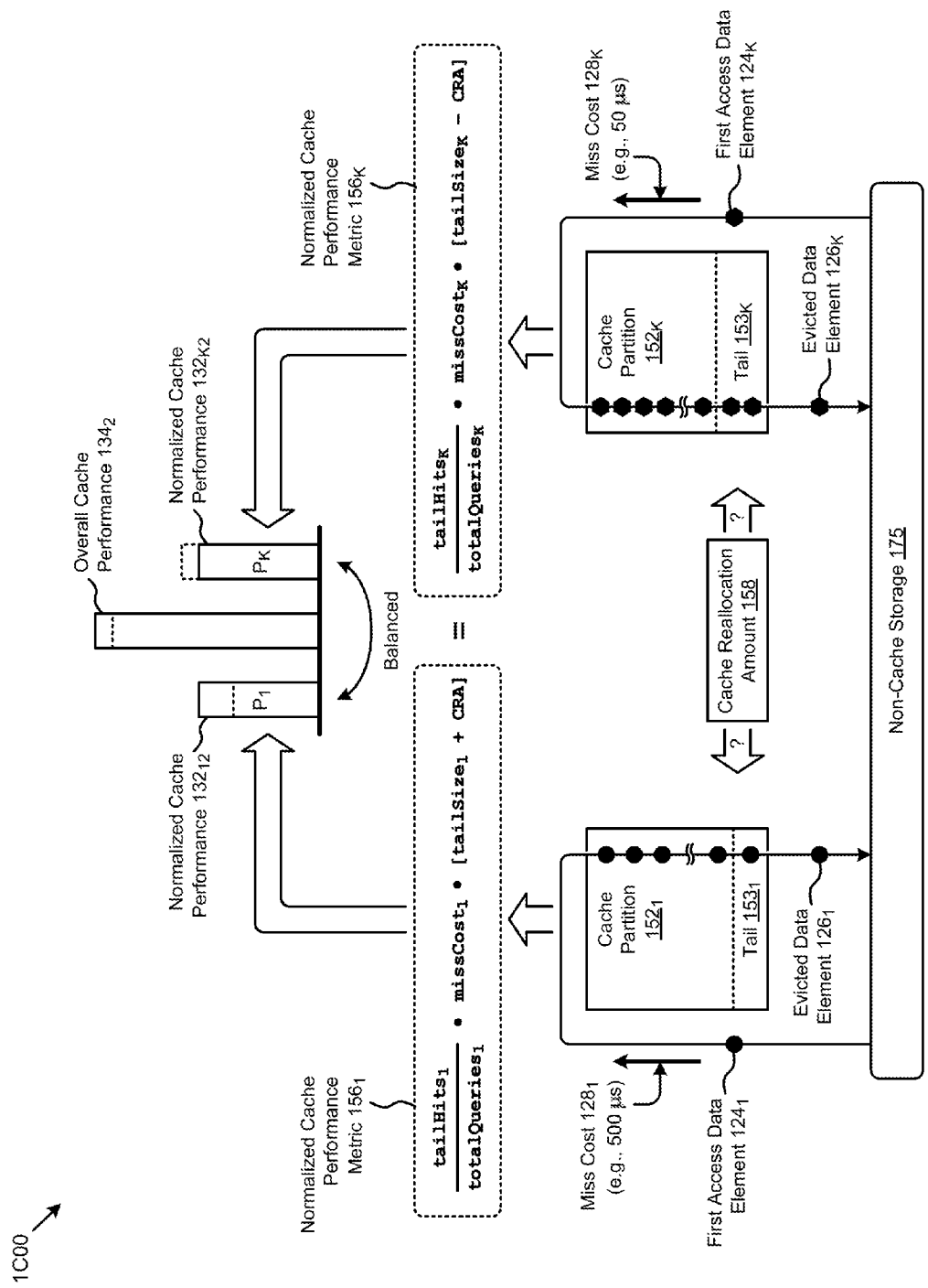
FIG. 1C illustrates a dynamic cache balancing technique used in systems that implement dynamic sizing of multiple cache partitions, according to an embodiment.

FIG. 1C illustrates a dynamic cache balancing technique 1C00 used in systems that implement dynamic sizing of multiple cache partitions. As an option, one or more variations of dynamic cache balancing technique 1C00 or any aspect thereof may be implemented in the context of the architecture and functionality of the embodiments described herein. The dynamic cache balancing technique 1C00 or any aspect thereof may be implemented in any environment.

In certain embodiments, a "tail" of the cache partition can be analyzed to facilitate balancing the performance of various cache partitions in a cache memory space. In some cases, such balancing can further improve the overall cache performance. Specifically, the cache partition tail can represent the least accessed or hit data elements in the cache partition when determining the value of adding more space to the cache partition. More specifically, by monitoring the hit rate to the tail data element or data elements in the cache partition, the cache hit rate increase precipitated by adding more data elements (e.g., by increasing the cache partition size) can be predicted. Since cache accesses or queries can be stochastic, the cache partition tail might be defined as a percentage of some cache partition attribute such as a total number of cache partition elements, or a total number of cache partition data element hits. For example, the cache partition tail might be defined as the least hit 10% of the cache partition data elements.

Certain normalization factors can be used to facilitate comparison of various cache partitions comprising different types of data elements. One normalization factor earlier mentioned is miss cost. Miss cost can normalize for the latency in retrieving a data element not in cache. For example, in some cases, the time to retrieve a metadata element from non-cache storage can be long as compared to the time to retrieve an extent data element from non-cache storage. In other cases, one cache partition can be queried more frequently as compared to another cache partition. Such query frequency differences can be addressed with a normalization factor to adjust for total cache partition queries. Further, data element sizes can vary by and between cache partitions. The tail size (e.g., in MB) for each respective cache partition can normalize for such data element size differences. Other normalization factors are possible.

According to some embodiments, the foregoing techniques and/or normalization factors can be combined in a linear formula that approximates an objective function for maximizing the performance of a set of cache partitions. For example, the normalized cache performance metric $156_1$ and the normalized cache performance metric $156_K$ for cache partition $152_1$ and cache partition $152_K$, respectively, can be determined according to the following formula:

$$CPM_{Nx} = [tailHits_x \div totalQueries_x] \cdot missCost_x \cdot [tailSize_x \pm CRA] \quad (EQ.\ 1)$$

where:
$CPM_{Nx}$ = cache performance metric for cache N and partition X
$tailHits_x$ = number of data element hits in tail of cache partition X
$totalQueries_x$ = total number of data element queries for cache partition X
$missCost_x$ = miss cost (e.g., in μS) of data element in cache partition X
$tailSize_x$ = tail size (e.g., in MB) of tail of cache partition X
$CRA$ = cache reallocation amount.

The formula in EQ. 1 can be used to balance two cache partitions by equating a first instance of EQ. 1 with +CRA corresponding to a first cache partition with a second instance of EQ. 1 with −CRA corresponding to a second cache partition. As an example, $$CPM_{N1} = CPM_{NK}$$

$$[2 \div 100] \cdot 500\ \mu s \cdot [50\ MB + CRA] = [5 \div 100] \cdot 50\ \mu s \cdot [250\ MB - CRA]$$

$$CRA = 10\ MB$$

In the foregoing example, cache partition $152_1$ can be increased by 10 MB and cache partition $152_K$ can be decreased by 10 MB to balance the performance of the cache partitions. As illustrated in FIG. 1C, such balanced performance can be represented by a normalized cache performance $132_{12}$ and a normalized cache performance $132_{K2}$. As shown, the performance of the two cache partitions is balanced. Further, while the normalized cache performance $132_{K2}$ of cache partition $152_K$ may be reduced as compared to the normalized cache performance $132_{K1}$ shown in FIG. 1B, the overall cache performance $134_2$ has increased as compared to the overall cache performance $134_1$ shown in FIG. 1B.

As earlier described, the herein disclosed techniques can address the problems attendant to balancing the sizes of multiple cache partitions in distributed storage systems. One embodiment of an environment comprising such a distributed storage system is shown and described as pertains to FIG. 2.

Figure 2:
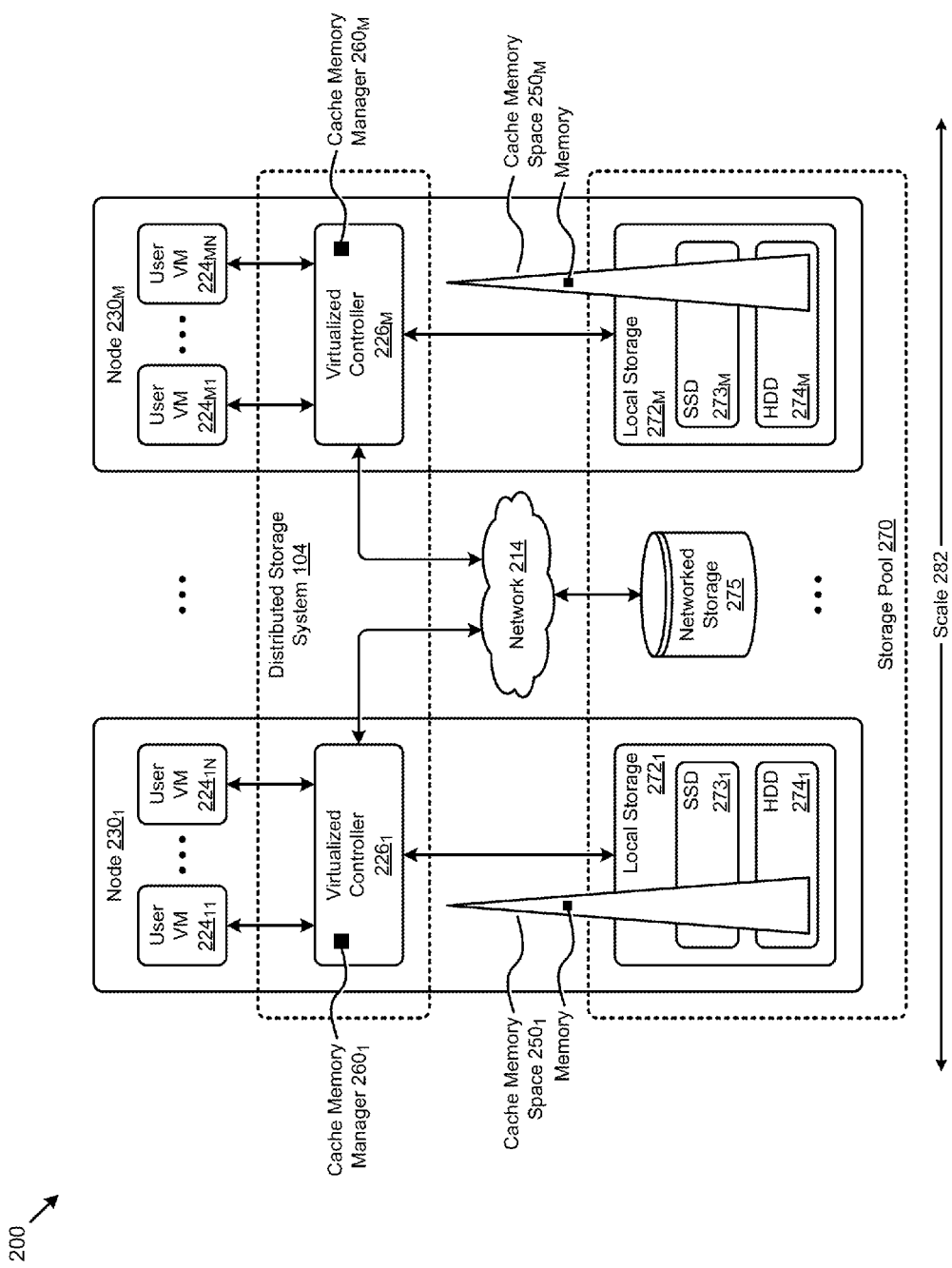
FIG. 2 presents an environment in which embodiments of the present disclosure can operate.

FIG. 2 presents an environment 200 in which embodiments of the present disclosure can operate. As an option, one or more variations of environment 200 or any aspect thereof may be implemented in the context of the architecture and functionality of the embodiments described herein. The environment 200 or any aspect thereof may be implemented in any environment.

The environment 200 shows various components associated with one instance of a distributed storage system 104 that can be used to implement the herein disclosed techniques. Specifically, the environment 200 can comprise multiple nodes (e.g., node $230_1$, ..., node $230_M$) that have multiple tiers of storage in a storage pool 270. For example, each node can be associated with one server, multiple servers, or portions of a server. A group of such nodes can be called a cluster. The multiple tiers of storage can include storage that is accessible through the network 214, such as a networked storage 275 (e.g., a storage area network or SAN, network attached storage or NAS, etc.). The storage pool 270 can also comprise one or more instances of local storage (e.g., local storage $272_1$, . . . , local storage $272_M$) that is within or directly attached to a server and/or appliance associated with the nodes. Such local storage can include solid state drives (SSD $273_1$, . . . , SSD $273_M$), hard disk drives (HDD $274_1$, HDD $274_M$), and/or other storage devices.

Each node can implement at least one instance of a virtualized controller (e.g., virtualized controller $226_1$, . . . , virtualized controller $226_M$) to facilitate access to the storage pool 270 by one or more user virtual machine or VMs (e.g., user VM $224_{11}$, . . . , user VM $224_{1N}$, . . . , user VM $224_{M1}$, . . . , user VM $224_{MN}$) that run client software. The hardware of the node can be emulated for the user VMs by various hypervisors. For example, such hypervisors can be implemented using virtualization software (e.g., VMware ESXi, Microsoft Hyper-V, RedHat KVM, Nutanix AHV, etc.) that includes a hypervisor. Multiple instances of such virtualized controllers can coordinate within a cluster to form the distributed storage system 104 which can, among other operations, manage the storage pool 270. This architecture further facilitates efficient scaling of the distributed computing and/or storage platform (e.g., see scale 282).

The foregoing virtualized controllers can be implemented in environment 200 using various techniques. Specifically, containers (e.g., Docker containers) can be used to implement a virtualized controller at the node. In this case, the user VMs can access the storage pool 270 by interfacing with a controller container through a hypervisor and/or the kernel of the node host operating system. As another virtualized controller implementation example, an instance of a virtual machine at a given node can be used as a virtualized controller to manage storage and I/O activities. In this case, the user VMs at the node can interface with a controller virtual machine (e.g., controller VM) through a hypervisor to access the storage pool 270. In such cases, the controller VMs are not formed as part of specific implementations of the hypervisors. Instead, the controller VMs can run as virtual machines above the hypervisors on the various servers. When the controller VMs run above the hypervisors, varying virtual machine architectures and/or hypervisors can operate with the distributed storage system 104. For example, a hypervisor at one node in the distributed storage system 104 might correspond to VMware ESXi software, and a hypervisor at another node in the distributed storage system 104 might correspond to Nutanix AHV software.

As shown in environment 200, cache memory spaces (e.g., cache memory space $250_1$, . . . , cache memory space $250_M$) can be implemented in various storage facilities in the nodes associated with the distributed storage system 104. Specifically, in one embodiment, the cache memory space might be allocated using a portion of memory (e.g., DRAM of the node) and/or a portion of the SSD memory, and/or a portion of the HDD memory. A cache can be formed from any portions of the foregoing components and/or take on physical characteristics (e.g., megabytes of DRAM) and/or can take on logical characteristics (e.g., single-touch entries, multi-touch entries, large entries, small entries, etc.). Strictly as examples, a cache can be formed using purely hardware components, or a cache can be formed or addressed using software components or any combinations of hardware and software components. A cache might be composed of some DRAM, and some SDD and some HDD space (or combinations thereof), or a cache might be composed of a first data element type entry (e.g., comprising smaller entries) and a second data element type entry (e.g., comprising larger entries). Any cache of any type can host two or more partitions that can be bounded by hardware boundaries and/or bounded by software boundaries, or both.

In one example of a cache, a read request (e.g., query) for a first access data element might place the data element for access by the virtualized controller (e.g., in a single-touch pool) where it can be managed by various cached management techniques (e.g., LRU) until it is evicted. At some moment in time prior to eviction, the data element might be moved to SSD memory (e.g., in a multi-touch pool). In some cases, the various pools of cache might be managed in part by separate management algorithms (e.g., independent LRU counters). Multiple cache partitions comprising multiple pools are possible.

Further details regarding general approaches to allocation of memory to caches are described in U.S. application Ser. No. 14/985,268 titled, "SPONTANEOUS RECONFIGURATION OF DATA STRUCTURES USING BALLOON MEMORY ALLOCATION filed on Dec. 30, 2015, which is hereby incorporated by reference in its entirety.

In certain embodiments, one or more instances of a cache memory manager can be implemented in the distributed storage system 104 to facilitate the herein disclosed techniques. Specifically, an instance of the cache memory manager $260_1$ can be implemented in the virtualized controller $226_1$, and another instance of the cache memory manager $260_M$ can be implemented in the virtualized controller $226_M$. Such instances of the cache memory manager can be implemented in any node in any cluster. Further details regarding one implementation of the cache memory manager for facilitating the herein disclosed techniques is shown and described as pertaining to FIG. 3A.

Figure 3A:
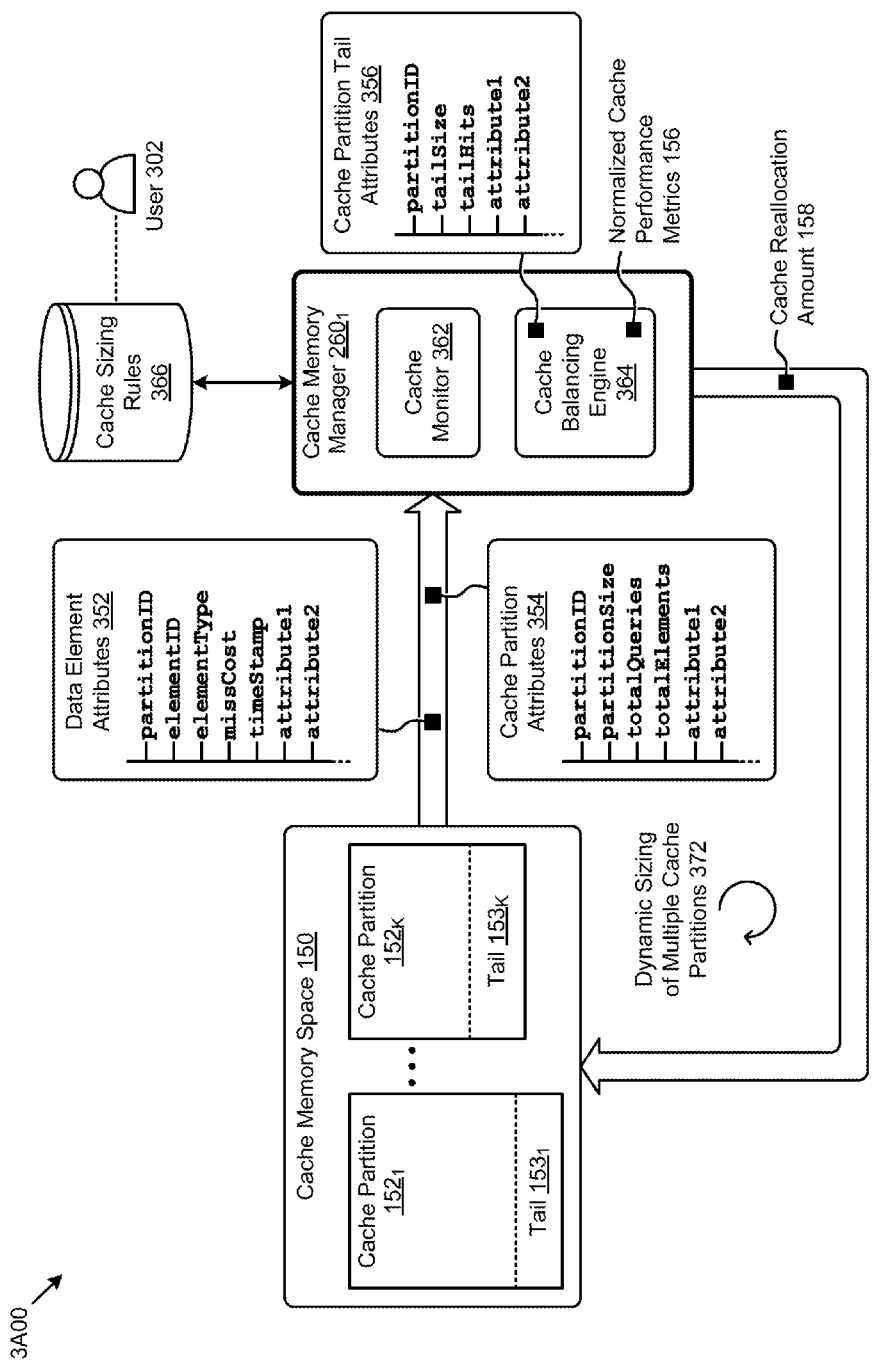
FIG. 3A depicts examples of implementation techniques as used in systems that implement dynamic sizing of multiple cache partitions, according to an embodiment.

FIG. 3A depicts examples of implementation techniques 3A00 as used in systems that implement dynamic sizing of multiple cache partitions. As an option, one or more variations of implementation techniques 3A00 or any aspect thereof may be implemented in the context of the architecture and functionality of the embodiments described herein. The implementation techniques 3A00 or any aspect thereof may be implemented in any environment.

As shown in FIG. 3A, the cache memory manager $260_1$ earlier described can interact with various components in a distributed storage platform to implement the herein disclosed techniques. Specifically, the cache memory manager $260_1$ might comprise a cache monitor 362 to receive various attributes pertaining to a certain cache memory space (e.g., cache memory space 150). Such attributes can comprise a set of data element attributes 352 and/or a set of cache partition attributes 354. For example, the data element attributes 352 can comprise certain attributes corresponding to the data elements in a given cache partition represented by a partition identifier or partitionID such as a data element identifier or elementID, a data element type or elementType (e.g., metadata, extent data, etc.), a miss cost or missCost associated with the data element, a timestamp or timestamp corresponding to the last access time of the data element at the head of the queue, and/or other attributes. Also, for example, the cache partition attributes 354 can comprise certain attributes corresponding to a given cache partition represented by a partition identifier or partitionID such as a cache partition size or partitionSize, a total number of cache partition queries or totalQueries, a total number of cache partition data elements or totalElements, a tail size or tailSize, and/or other attributes. In some embodiments, the foregoing attributes can be stored in a tabular structure with the shown attribute representing the table columns and the each of the respective items (e.g., data elements, cache partitions) representing the table rows. In other embodiments, the attributes can be stored as key-value pairs in computer programming objects.

Referring to FIG. 3A, a cache balancing engine 364 in the cache memory manager $260_1$ can receive one or more of the data element attributes 352 and/or the cache partition attributes 354 to generate a set of cache partition tail attributes 356. For example, the cache partition tail attributes 356 might described the tail $153_1$ of cache partition $152_1$ and/or the tail $153_K$ of cache partition $152_K$. For example, the cache partition tail attributes 356 generated by the cache balancing engine 364 can comprise certain attributes corresponding to the tail of a given cache partition represented by a partition identifier or partitionID such as a tail size or tailSize, a number of hits on data elements in the tail or tailHits, and/or other attributes. Specifically, for example, when there is a uniform distribution of data elements in a cache partition queue, the timeStamp attribute of the data element attributes 352 can be used to efficiently determine one or more of the cache partition tail attributes 356.

Cache balancing engine 364 can further use the foregoing attributes and/or other information to determine the normalized cache performance metrics 156 corresponding to the cache partition analyzed, which normalized cache performance metrics can be used to determine a cache reallocation amount 158 for one or more cache partitions according to the herein disclosed techniques. In some cases, the cache balancing engine 364 and/or other components of the cache memory manager $260_1$ can access a set of cache sizing rules 366 for various purposes. For example, cache sizing rules 366 might indicate certain thresholds that, when breached, can trigger execution of one or more cache balancing operations. In such cases, continual monitoring of the cache memory space 150 by cache monitor 362 can facilitate a dynamic sizing of the cache partitions when, for example, certain data element and/or cache partition attributes breach their respective thresholds (operation 372). In some cases, the thresholds can be set such that cache size adjustments do not occur too frequently (e.g., providing a hysteresis effect). The cache sizing rules 366 might also indicate certain constraints imposed by the underlying system (e.g., distributed storage system) and/or by a user 302 (e.g., system administrator). For example, a total cache memory size might be allocated in the cache sizing rules 366 based on system capabilities and/or user specification.

Figure 3B:
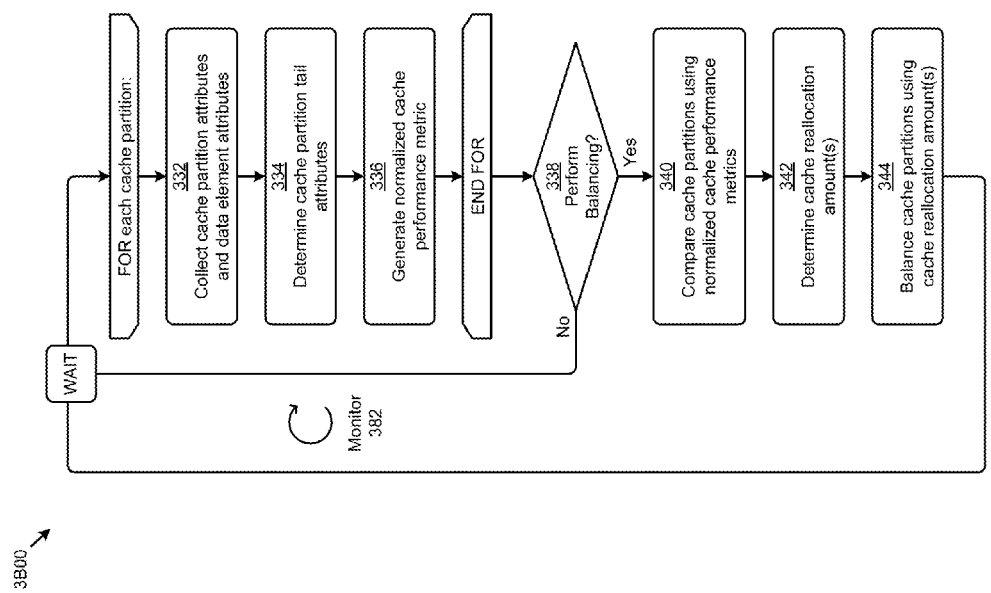
FIG. 3B presents a dynamic cache partition balancing technique as implemented in systems that perform dynamic sizing of multiple cache partitions, according to some embodiments.

A technique for monitoring cache partitions to perform dynamic cache balancing is shown and described as pertaining to FIG. 3B.

FIG. 3B presents a dynamic cache partition balancing technique 3B00 as implemented in systems that perform dynamic sizing of multiple cache partitions. As an option, one or more variations of dynamic cache partition balancing technique 3B00 or any aspect thereof may be implemented in the context of the architecture and functionality of the embodiments described herein. The dynamic cache partition balancing technique 3B00 or any aspect thereof may be implemented in any environment.

The dynamic cache partition balancing technique 3B00 presents one embodiment of certain steps and/or operations for facilitating dynamic sizing of multiple cache partitions according to the herein disclosed techniques. In one or more embodiments, the steps and underlying operations comprising the dynamic cache partition balancing technique 3B00 can be executed by an instance of the cache memory manager $260_1$ as shown and described in FIG. 3A and herein.

As shown, the dynamic cache partition balancing technique 3B00 can perform a set of operations for each cache partition managed (e.g., at a node in a distributed storage system) commencing with collecting cache partition attributes and/or data element attributes pertaining to a given cache partition (at step 332). Using the collected attributes and/or other information, various cache partition tail attributes can be determined (at step 334). A normalized cache performance metric can then be generated for the cache partition (at step 336). When the foregoing attributes and/or metrics have been collected and/or generated for each cache partition, a determination can be made whether to perform any cache balancing (at decision 338). For example, in some cases, there might be no change to the aforementioned attributes and/or metric since an earlier balancing operation such that another balancing operation need not be invoked. Specifically, one or more of the attributes and/or metrics might be compared to various thresholds and/or rules to make such a determination. If no cache partition balancing is to be performed (see "No" path of decision 338), then monitoring of the cache partitions can continue (operation 382).

If cache partition balancing is invoked (see "Yes" path of decision 338), the cache partitions can be compared using the normalized cache performance metrics earlier determined (at step 340). Various approaches can be implemented to compare more than two cache partitions. For example, the cache partitions having the minimum and maximum normalized cache performance metrics might be first compared. The next pair of cache partitions having the broadest spread between respective normalized cache performance metrics might then be compared. This process can be iterated until all have been compared and/or a spread threshold has been reached. Certain linearization techniques can also be implemented to determine an equilibrium point (e.g., balanced performance) for the functions representing the normalized performance of the cache partitions. A set of cache reallocation amounts determined from such comparison techniques can be determined (at step 342). The cache reallocation amounts can be added to and/or subtracted from the appropriate cache partitions to balance the partitions (at step 344). When the cache partition resizing is complete, the monitoring of the cache partitions can continue (operation 382).

Additional Embodiments of the Disclosure

Additional Practical Application Examples

Figure 4A:
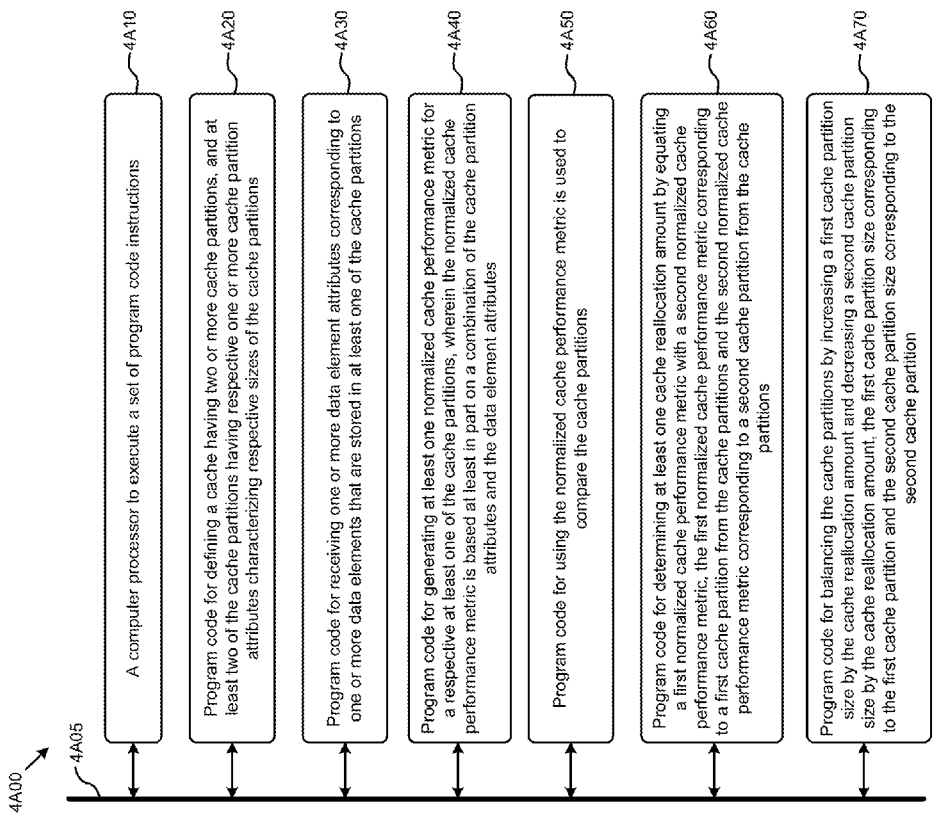
FIG. 4A and FIG. 4B depict system components as arrangements of computing modules that are interconnected so as to implement certain of the herein-disclosed embodiments.

FIG. 4A depicts a system 4A00 as an arrangement of computing modules that are interconnected so as to operate cooperatively to implement certain of the herein-disclosed embodiments. The partitioning of system 4A00 is merely illustrative and other partitions are possible. As an option, the system 4A00 may be implemented in the context of the architecture and functionality of the embodiments described herein. Of course, however, the system 4A00 or any operation therein may be carried out in any desired environment. The system 4A00 comprises at least one processor and at least one memory, the memory serving to store program instructions corresponding to the operations of the system. As shown, an operation can be implemented in whole or in part using program instructions accessible by a module. The modules are connected to a communication path 4A05, and any operation can communicate with other operations over communication path 4A05. The modules of the system can, individually or in combination, perform method operations within system 4A00. Any operations performed within system 4A00 may be performed in any order unless as may be specified in the claims. The shown embodiment implements a portion of a computer system, presented as system 4A00, comprising a computer processor to execute a set of program code instructions (module 4A10) and modules for accessing memory to hold program code instructions to perform: defining a cache having two or more cache partitions, and at least two of the cache partitions having respective one or more cache partition attributes characterizing respective sizes of the cache partitions (module 4A20); receiving one or more data element attributes corresponding to one or more data elements that are stored in at least one of the cache partitions (module 4A30); generating at least one normalized cache performance metric for a respective at least one of the cache partitions, wherein the normalized cache performance metric is based at least in part on a combination of the cache partition attributes and the data element attributes, and (module 4A40); using the normalized cache performance metric to compare the cache partitions (module 4A50); determining at least one cache reallocation amount by equating a first normalized cache performance metric with a second normalized cache performance metric, the first normalized cache performance metric corresponding to a first cache partition from the cache partitions and the second normalized cache performance metric corresponding to a second cache partition from the cache partitions (module 4A60); and balancing the cache partitions by increasing a first cache partition size by the cache reallocation amount and decreasing a second cache partition size by the cache reallocation amount, the first cache partition size corresponding to the first cache partition and the second cache partition size corresponding to the second cache partition (module 4A70).

Variations of the foregoing may include more or fewer of the shown modules and variations may perform more or fewer (or different) steps, and/or may use data elements in more, or in fewer (or different) operations.

Strictly as examples, some embodiments include:

- Variations where determining the cache reallocation amount is responsive to a change to at least one of, the cache partition attributes, or the data element attributes.
- Variations where the first cache partition comprises a first portion of the data elements characterized by a first data element type and a second cache partition from the cache partitions comprises a second portion of the data elements characterized by a second data element type.
- Variations where the first portion of the data elements comprises extent data and the second portion of the data elements comprises metadata.
- Variations where the data element attributes comprise at least one of, a partition identifier, a data element identifier, a data element type, a miss cost, or a timestamp.
- Variations where the cache partition attributes comprise at least one of, a partition identifier, a cache partition size, or a total number of cache partition queries.
- Variations where the normalized cache performance metric is derived at least in part from one or more cache partition tail attributes characterizing a cache partition tail corresponding to a respective one of the cache partitions.
- Variations where the cache partition tail attributes comprise at least one of, a partition identifier, a tail size, or a number of hits on data elements in the cache partition tail.
- Variations where the cache partition tail is defined based at least in part on at least one of, a number of cache partition data elements, or a number of cache partition data element hits.
- Variations where generating the normalized cache performance metric is based at least in part on a set of cache sizing rules.

Figure 4B:
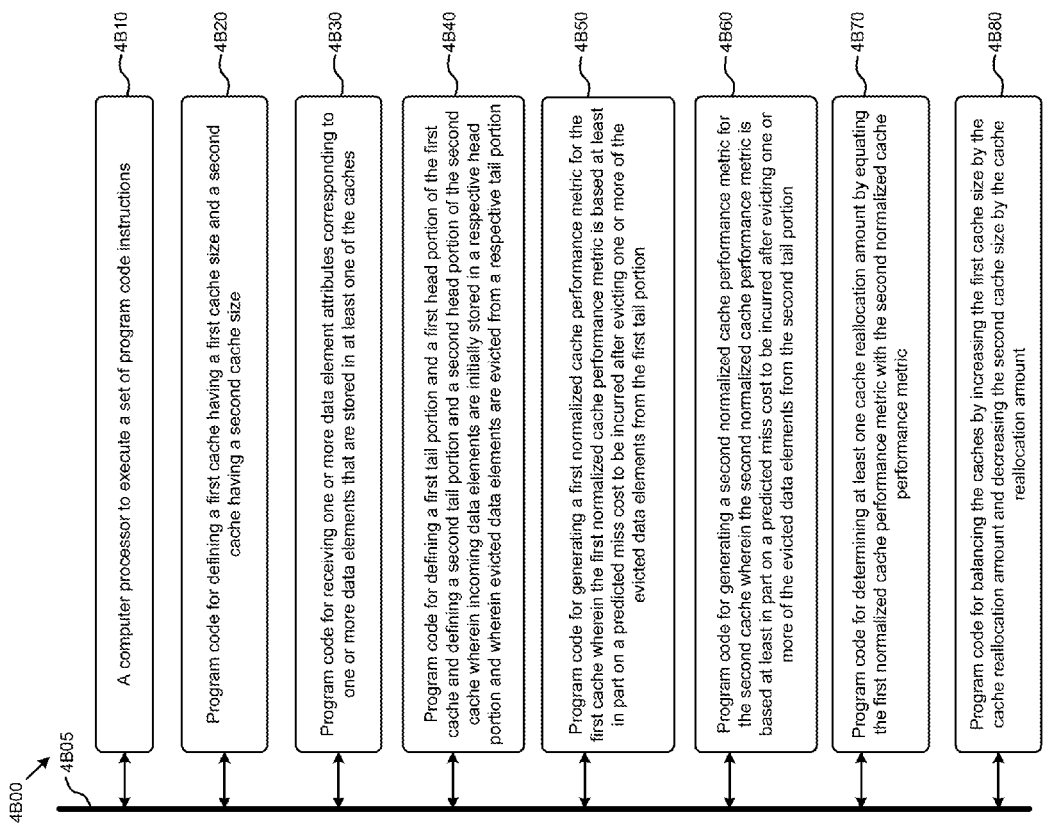

FIG. 4B depicts a system 4B00 as an arrangement of computing modules that are interconnected so as to operate cooperatively to implement certain of the herein-disclosed embodiments. The partitioning of system 4B00 is merely illustrative and other partitions are possible. As an option, the system 4B00 may be implemented in the context of the architecture and functionality of the embodiments described herein. Of course, however, the system 4B00 or any operation therein may be carried out in any desired environment. The system 4B00 comprises at least one processor and at least one memory, the memory serving to store program instructions corresponding to the operations of the system. As shown, an operation can be implemented in whole or in part using program instructions accessible by a module. The modules are connected to a communication path 4B05, and any operation can communicate with other operations over communication path 4B05. The modules of the system can, individually or in combination, perform method operations within system 4B00. Any operations performed within system 4B00 may be performed in any order unless as may be specified in the claims. The shown embodiment implements a portion of a computer system, presented as system 4B00, comprising a computer processor to execute a set of program code instructions (module 4B10) and modules for accessing memory to hold program code instructions to perform: defining a first cache having a first cache size and a second cache having a second cache size (module 4B20); receiving one or more data element attributes corresponding to one or more data elements that are stored in at least one of the caches (module 4B30); defining a first tail portion and a first head portion of the first cache and defining a second tail portion and a second head portion of the second cache wherein incoming data elements are initially stored in a respective head portion and wherein evicted data elements are evicted from a respective tail portion (module 4B40); generating a first normalized cache performance metric for the first cache wherein the first normalized cache performance metric is based at least in part on a predicted miss cost to be incurred after evicting one or more of the evicted data elements from the first tail portion (module 4B50); generating a second normalized cache performance metric for the second cache wherein the second normalized cache performance metric is based at least in part on a predicted miss cost to be incurred after evicting one or more of the evicted data elements from the second tail portion (module 4B60); determining at least one cache reallocation amount by equating the first normalized cache performance metric with the second normalized cache performance metric (module 4B70); and balancing the caches by increasing the first cache size by the cache reallocation amount and decreasing the second cache size by the cache reallocation amount (module 4B80).

System Architecture Overview

Additional System Architecture Examples

Figure 5A:
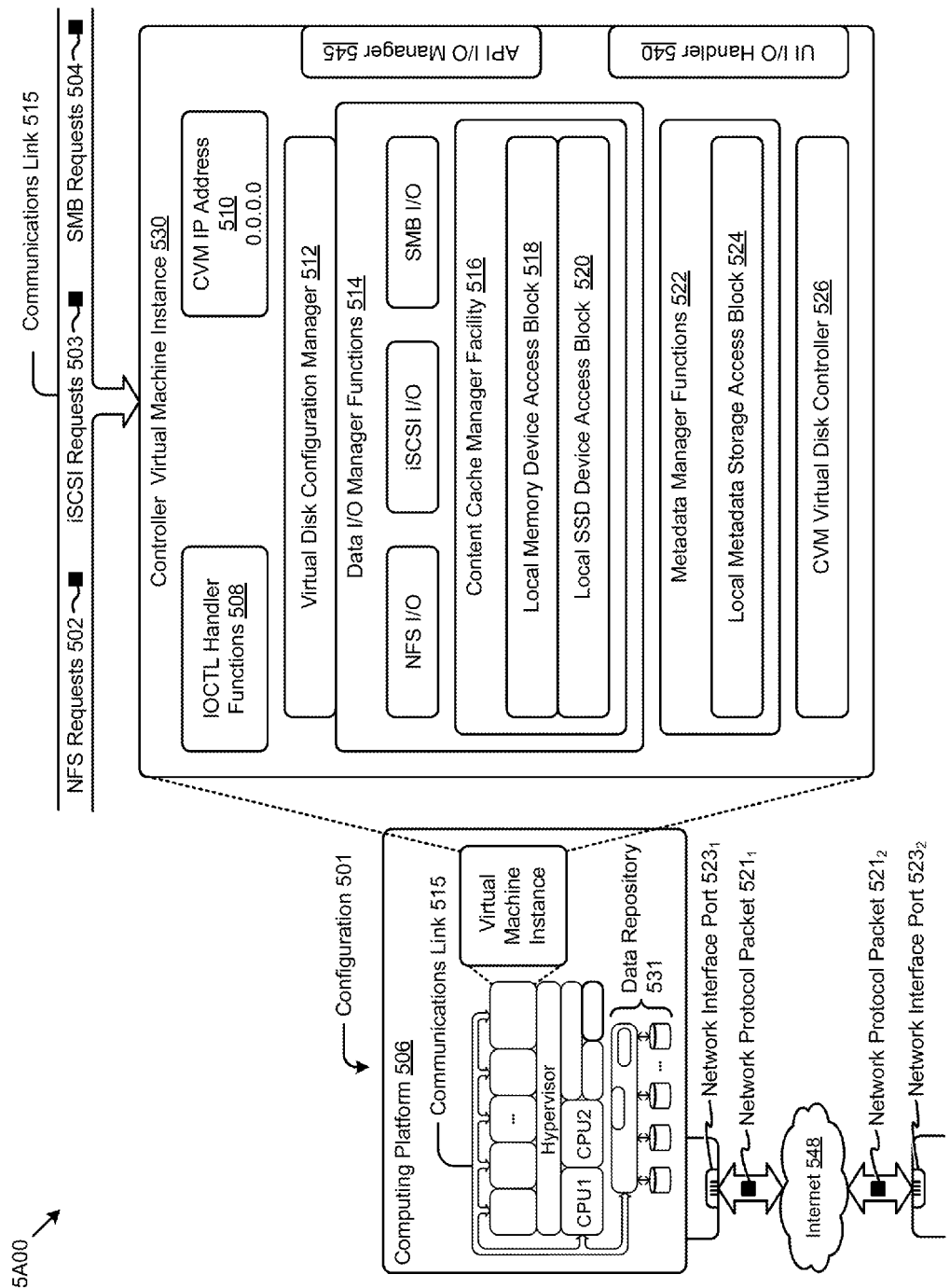
FIG. 5A and FIG. 5B depict virtualized controller architectures comprising collections of interconnected components suitable for implementing embodiments of the present disclosure and/or for use in the herein-described environments.

FIG. 5A depicts a virtualized controller as implemented by the shown virtual machine architecture 5A00. The virtual machine architecture comprises a collection of interconnected components suitable for implementing embodiments of the present disclosure and/or for use in the herein-described environments. Moreover, the shown virtual machine architecture 5A00 includes a virtual machine instance in a configuration 501 that is further described as pertaining to the controller virtual machine instance 530. A controller virtual machine instance receives block I/O (input/output or IO) storage requests as network file system (NFS) requests in the form of NFS requests 502, and/or internet small computer storage interface (iSCSI) block IO requests in the form of iSCSI requests 503, and/or Samba file system (SMB) requests in the form of SMB requests 504. The controller virtual machine (CVM) instance publishes and responds to an internet protocol (IP) address (e.g., see CVM IP address 510). Various forms of input and output (I/O or IO) can be handled by one or more IO control handler functions (see IOCTL functions 508) that interface to other functions such as data IO manager functions 514 and/or metadata manager functions 522. As shown, the data IO manager functions can include communication with a virtual disk configuration manager 512 and/or can include direct or indirect communication with any of various block IO functions (e.g., NFS IO, iSCSI IO, SMB IO, etc.).

In addition to block IO functions, the configuration 501 supports IO of any form (e.g., block IO, streaming IO, packet-based IO, HTTP traffic, etc.) through either or both of a user interface (UI) handler such as UI IO handler 540 and/or through any of a range of application programming interfaces (APIs), possibly through the shown API IO manager 545.

The communications link 515 can be configured to transmit (e.g., send, receive, signal, etc.) any types of communications packets comprising any organization of data elements. The data elements can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid-state storage devices (SSDs) or optical or magnetic disks such as disk drives or tape drives. Volatile media includes dynamic memory such as a random access memory. As shown, the controller virtual machine instance 530 includes a content cache manager facility 516 that accesses storage locations, possibly including local dynamic random access memory (DRAM) (e.g., through the local memory device access block 518) and/or possibly including accesses to local solid-state storage (e.g., through local SSD device access block 520).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 531, which in turn can be formatted into any one or more storage areas, and which can comprise parameterized storage accessible by a key (e.g., a filename, a table name, a block address, an offset address, etc.). An external data repository 531 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 524. The external data repository 531 can be configured using a CVM virtual disk controller 526, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 501 can be coupled by a communications link 515 (e.g., backplane, LAN, PTSN, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port $523_1$ and network interface port $523_2$). The configuration 501 can be addressed through one or more network interface ports using an IP address. Any operational element within computing platform 506 can perform sending and receiving operations using any of a range of network protocols, possibly including network protocols that send and receive packets (e.g., see network protocol packet $521_1$ and network protocol packet $521_2$).

The computing platform 506 may transmit and receive messages that can be composed of configuration data, and/or any other forms of data and/or instructions organized into a data structure (e.g., communications packets). In some cases, the data structure includes program code instructions (e.g., application code) communicated through Internet 548 and/or through any one or more instances of communications link 515. Received program code may be processed and/or executed by a CPU as it is received and/or program code may be stored in any volatile or non-volatile storage for later execution. Program code can be transmitted via an upload (e.g., an upload from an access device over the Internet 548 to computing platform 506). Further, program code and/or results of executing program code can be delivered to a particular user via a download (e.g., a download from the computing platform 506 over the Internet 548 to an access device).

The configuration 501 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or other characteristics of performing dynamic sizing of multiple cache partitions.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic sizing of multiple cache partitions). Such files or records can be brought into and/or stored in volatile or non-volatile memory.

Figure 5B:
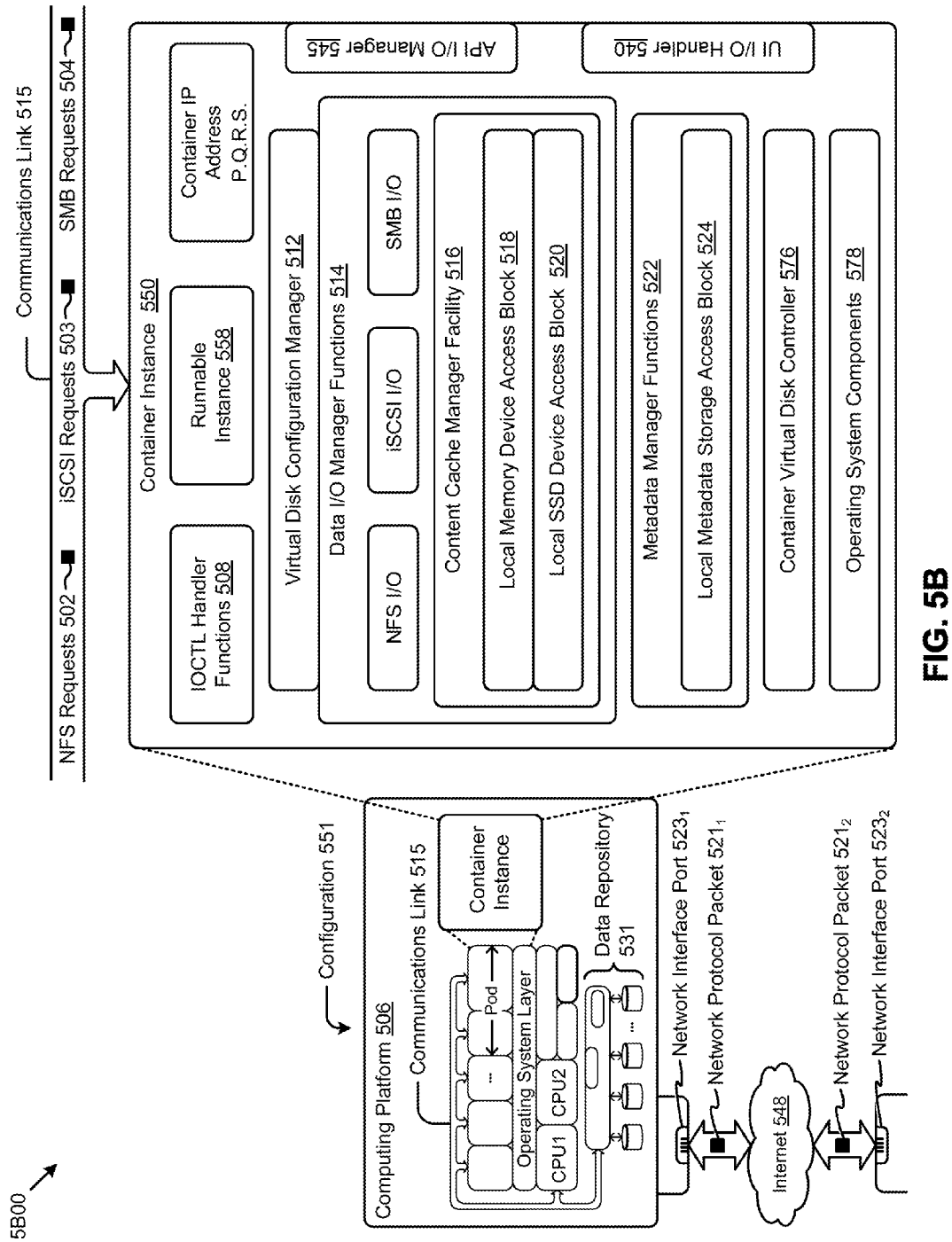

FIG. 5B depicts a virtualized controller implemented by a containerized architecture 5B00. The containerized architecture comprises a collection of interconnected components suitable for implementing embodiments of the present disclosure and/or for use in the herein-described environments. Moreover, the shown containerized architecture 5B00 includes a container instance in a configuration 551 that is further described as pertaining to the container instance 550. The configuration 551 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 550). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls –a", etc.). The container might optionally include operating system components 578, however such a separate set of operating system components need not be provided. As an alternative, a container can include a runnable instance 558, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   defining a first cache having a first cache size and a second cache having a second cache size;
   receiving one or more data element attributes corresponding to one or more data elements that are stored in at least one of the caches;
   defining a first tail portion and a first head portion of the first cache and defining a second tail portion and a second head portion of the second cache, wherein incoming data elements are initially stored in a respective head portion and wherein evicted data elements are evicted from a respective tail portion;
   generating a first normalized cache performance metric pertaining to the first cache, wherein the first normalized cache performance metric is based at least in part on a predicted miss cost to be incurred after evicting one or more of the evicted data elements from the first tail portion;
   generating a second normalized cache performance metric pertaining to the second cache, wherein the second normalized cache performance metric is based at least in part on a predicted miss cost to be incurred after evicting one or more of the evicted data elements from the second tail portion;
   determining at least one cache reallocation amount by equating the first normalized cache performance metric with the second normalized cache performance metric; and
   balancing the caches by increasing the first cache size by the cache reallocation amount and decreasing the second cache size by the cache reallocation amount.

2. The method of claim 1, wherein determining the cache reallocation amount is responsive to a change to at least one of, one or more cache attributes, or the data element attributes.

3. The method of claim 2, wherein the cache attributes comprise at least one of, a identifier, a cache size, or a total number of cache queries.

4. The method of claim 1, wherein the first cache comprises a first portion of the data elements characterized by a first data element type and a second cache from the caches comprises a second portion of the data elements characterized by a second data element type.

5. The method of claim 4, wherein the first portion of the data elements comprises extent data and the second portion of the data elements comprises metadata.

6. The method of claim 1, wherein the data element attributes comprise at least one of, a identifier, a data element identifier, a data element type, a miss cost, or a timestamp.

7. The method of claim 1, wherein the normalized cache performance metric is derived at least in part from one or more cache tail attributes characterizing a cache tail corresponding to a respective one of the caches.

8. The method of claim 7, wherein the cache tail attributes comprise at least one of, a identifier, a tail size, or a number of hits on data elements in the cache tail.

9. The method of claim 7, wherein the cache tail is defined based at least in part on at least one of, a number of cache data elements, or a number of cache data element hits.

10. The method of claim 1, wherein generating the normalized cache performance metric is based at least in part on a set of cache sizing rules.

11. A computer readable medium, embodied in a non-transitory computer readable medium, the non-transitory computer readable medium having stored thereon a sequence of instructions which, when stored in memory and executed by one or more processors causes the one or more processors to perform a set of acts the acts comprising:
    defining a first cache having a first cache size and a second cache having a second cache size;
    receiving one or more data element attributes corresponding to one or more data elements that are stored in at least one of the caches;
    defining a first tail portion and a first head portion of the first cache and defining a second tail portion and a second head portion of the second cache, wherein incoming data elements are initially stored in a respective head portion and wherein evicted data elements are evicted from a respective tail portion;
    generating a first normalized cache performance metric pertaining to the first cache, wherein the first normalized cache performance metric is based at least in part on a predicted miss cost to be incurred after evicting one or more of the evicted data elements from the first tail portion;
    generating a second normalized cache performance metric pertaining to the second cache, wherein the second normalized cache performance metric is based at least in part on a predicted miss cost to be incurred after evicting one or more of the evicted data elements from the second tail portion;
    determining at least one cache reallocation amount by equating the first normalized cache performance metric with the second normalized cache performance metric; and
    balancing the caches by increasing the first cache size by the cache reallocation amount and decreasing the second cache size by the cache reallocation amount.

12. The computer readable medium of claim 11, wherein determining the cache reallocation amount is responsive to a change to at least one of, one or more cache attributes, or the data element attributes.

13. The computer readable medium of claim 12, wherein the cache attributes comprise at least one of, a identifier, a cache size, or a total number of cache queries.

14. The computer readable medium of claim 11, wherein the first cache comprises a first portion of the data elements characterized by a first data element type and a second cache from the caches comprises a second portion of the data elements characterized by a second data element type.

15. The computer readable medium of claim 14, wherein the first portion of the data elements comprises extent data and the second portion of the data elements comprises metadata.

16. The computer readable medium of claim 11, wherein the data element attributes comprise at least one of, a identifier, a data element identifier, a data element type, a miss cost, or a timestamp.

17. The computer readable medium of claim 11, wherein the normalized cache performance metric is derived at least in part from one or more cache tail attributes characterizing a cache tail corresponding to a respective one of the caches.

18. The computer readable medium of claim 17, wherein the cache tail attributes comprise at least one of, a identifier, a tail size, or a number of hits on data elements in the cache tail.

19. A system comprising:
    a storage medium having stored thereon a sequence of instructions; and
    one or more processors that execute the instructions to cause the one or more processors to perform a set of acts, the acts comprising,
    defining a first cache having a first cache size and a second cache having a second cache size;
    receiving one or more data element attributes corresponding to one or more data elements that are stored in at least one of the caches;
    defining a first tail portion and a first head portion of the first cache and defining a second tail portion and a second head portion of the second cache, wherein incoming data elements are initially stored in a respective head portion and wherein evicted data elements are evicted from a respective tail portion;
    generating a first normalized cache performance metric pertaining to the first cache, wherein the first normalized cache performance metric is based at least in part on a predicted miss cost to be incurred after evicting one or more of the evicted data elements from the first tail portion;
    generating a second normalized cache performance metric pertaining to the second cache, wherein the second normalized cache performance metric is based at least in part on a predicted miss cost to be incurred after evicting one or more of the evicted data elements from the second tail portion;
    determining at least one cache reallocation amount by equating the first normalized cache performance metric with the second normalized cache performance metric; and
    balancing the caches by increasing the first cache size by the cache reallocation amount and decreasing the second cache size by the cache reallocation amount.

20. The system of claim 19, wherein determining the cache reallocation amount is responsive to a change to at least one of, one or more cache attributes, or the data element attributes.

* * * * *